United States Patent [19]

Roth

[11] 4,209,432

[45] Jun. 24, 1980

[54] PROCESS FOR RENDERING BUILDING MATERIALS HYDROPHOBIC

[75] Inventor: Michael Roth, Burghausen, Fed. Rep. of Germany

[73] Assignee: Wacker-Chemie GmbH, Munich, Fed. Rep. of Germany

[21] Appl. No.: 943,494

[22] Filed: Sep. 18, 1978

Related U.S. Application Data

[63] Continuation of Ser. No. 749,142, Dec. 9, 1976, abandoned.

[30] Foreign Application Priority Data

Dec. 23, 1975 [DE] Fed. Rep. of Germany ....... 2558184

[51] Int. Cl.$^2$ ............................................. C08L 83/04
[52] U.S. Cl. ....................... 260/29.2 M; 260/31.2 R; 260/32.6 R; 260/32.8 SB; 260/33.2 SB; 260/33.4 SB; 260/33.6 SB; 260/33.8 SB

[58] Field of Search ................... 260/29.2 M, 31.2 R, 260/32.6 R, 32.8 SB, 33.2 SB, 33.4 SB, 33.6 SB, 33.8 SB, 37

[56] References Cited

FOREIGN PATENT DOCUMENTS 2356142  5/1975  Fed. Rep. of Germany .
1477720  6/1977  United Kingdom .

Primary Examiner—Lewis T. Jacobs

[57] ABSTRACT

An improved process for imparting hydrophobic properties to building materials by applying solutions containing organosilicon compounds to the surface of building materials, the improvement which comprises adding to the solutions of organosilicon compounds a small amount of fillers having a surface area of at least 50 m$^2$/gm.

3 Claims, No Drawings

PROCESS FOR RENDERING BUILDING MATERIALS HYDROPHOBIC

This is a continuation, of application Ser. No. 749,142, filed Dec. 9, 1976, now abandoned.

This invention relates to building materials which are hydrophobic and more particularily to an improved process for imparting hydrophobic properties to building materials by applying a solution of organosilicon compounds and a filler having a large surface area to the surface of the building materials.

Heretofore building materials have been rendered hydrophobic either by mixing the hydrophobic agent with the building material, for example cement, prior to molding or by applying the hydrophobic agent to the building materials after molding, for example, to the surface of an existing structure.

Processes for rendering building materials hydrophobic through the application of solutions of organosilicon compounds to the surfaces which are to be rendered hydrophobic have been described in, for example, E. B. Grunau "Fassade and Wasserhaushalt der Wand", Koln-Braunsfeld, 1967, page 42. In contrast to the use of organosilicon compounds which are emulsified or suspended in water and/or organic solvents, the use of a solution of organosilicon compounds has certain advantages. For example, breaking of the emulsions or suspensions do not occur on the surface of treated building materials. Moreover, solutions of organosilicon compounds can penetrate the building materials to a greater depth which provides for more effective impregnation, and thus renders the building materials hydrophobic for a longer period of time. Another advantage of using solutions of organosilicon compounds, especially solutions of organosilicon compounds in an organic solvent, is that they can be applied to building materials which have previously been treated with organosilicon compounds.

Compared to the processes known heretofore for rendering building materials hydrophobic by applying solutions of organosilicon compounds to the surface of building materials in the absence of fillers having a large surface area, the process of this invention offers several advantages. For example, the desired hydrophobic properties are achieved much more quickly so that if it should rain before the solvent has completely evaporated, the organosilicon compounds will not be washed off. Another advantage of the process of this invention is that a higher degree of water repellency can be achieved on building materials such as concrete or asbestos cement having a relatively small specific surface.

Although German Patent Application No. 2,356,142 describes a process for rendering building materials hydrophobic by applying to the building materials solutions of organosilicon compounds thickened with fillers having a surface area of at least 50 m²/gm to form pastes, it does not suggest that certain advantages are achieved by using unthickened solutions of organosilicon compounds. Also in the process described in the German patent application, the resultant coating or the remainder of the coating is removed upon evaporation of the solvent. In contrast to the process described in this reference, the process of this invention does not require that the loose filler residue be removed upon evaporation of the solvent.

Therefore, it is an object of this invention to provide building materials which are hydrophobic. Another object of this invention is to provide an improved process for imparting hydrophobic properties to building materials. Another object of this invention is to provide an improved process for rendering building materials hydrophobic using solutions of organosilicon compounds. Still another object of this invention is to provide an improved process for rendering building materials hydrophobic for a longer period of time. A further object of this invention is to provide an improved process for imparting hydrophobic properties to building materials which have been previously treated with organosilicon compounds. A still further object of this invention is to provide an improved process for imparting a higher degree of water repellency to building materials.

The foregoing objects and others which will become apparent from the following description are accomplished in accordance with this invention, generally speaking, by providing an improved process for imparting hydrophobic properties to building materials by applying a solution containing an organisilicon compound to the surface of building materials, the improvement which comprises adding from about 0.01 to 0.99 percent by weight based on the total weight of the solution, of fillers having a surface area of at least 50 m²/gm.

The organosilicon compounds employed in the process of this invention for imparting hydrophobic properties to building materials can be the same organosilicon compounds which have been employed heretofore to render the surface of building materials hydrophobic.

Examples of organosilicon compounds which can be used in this invention are organosilanes having the general formula:

$$R_n Si(OR')_{4-n},$$

in which R is the same or different and represents monovalent hydrocarbon radicals which are free of aliphatic unsaturation and which have from 1 to 18 carbon atoms, R' which is the same or different represents alkyl radicals having from 1 to 5 carbon atoms and alkyl radicals substituted with an oxyether, n is 1, 2 or 3 with an average of from 0.9 to 1.8, and partial hydrolysates thereof containing a maximum of 10 silicon atoms per molecule. Other organosilicon compounds which may be employed are the products obtained from the reaction of silanes of the general formula:

$$R_n SiCl_{4-n} \text{ or } Cl_3SiR''SiCl_3$$

with ethylene glycol or diethylene glycol, in which R, R'' and n are the same as above. Also, organosiloxanes having more than 10 silicon atoms per molecule may be employed which consist of units of the general formula:

$$R_x Si(OR')_y(OH)_z O_{(4-x-y-z)/2},$$

in which R and R' are the same as above, x, y and z are 0, 1, 2 or 3, with the sum of x+y+z being no more than 3, with the average value of x being equal to 0.9 to 1.8, preferably from 0.9 to 1.3, the average value of y and z being between 0.00 to 0.20, and at least one of the values of y and z being equal to 0.01.

Examples of hydrocarbon radicals represented by R are alkyl radicals, such as the methyl, ethyl, n-propyl, isopropyl, sec-butyl, amyl, octyl and octadecyl radicals, aryl radicals, such as the phenyl radical; alkaryl radicals, such as the tolyl radical; and aralkyl radicals such as the benzyl radical. Because of their availability, it is preferred that at least 50 percent of the number of R radicals be methyl radicals.

Examples of alkyl radicals represented by R' which have from 1 to 5 carbon atoms are ethyl, propyl, butyl and amyl radicals. An example of an alkyl radical represented by R' which is substituted with oxyether is the methoxyethyl radical.

The most important example of a bivalent alkyl radical represented by R'' is the ethylene radical.

Examples of other organosilicon compounds which may be employed to impart hydrophobic properties to building materials are alkali metal hydrocarbon siliconates which contain alkyl radicals having from 1 to 5 carbon atoms and/or phenyl radicals which are bonded to silicon via carbon. These alkali metal hydrocarbon siliconates are generally monomeric compounds of the general formula:

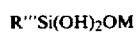

and/or polymeric compounds having units of the general formula:

in which R''' is the same or different and represents monovalent alkyl radicals having from 1 to 5 carbon atoms and/or the phenyl radical and M represents an alkali metal, such as sodium or potassium.

Examples of alkyl radicals represented by R''' having from 1 to 5 carbon atoms are the same as the alkyl radicals represented by R.

Mixtures of various organopolysiloxanes and/or organosilanes or partial hydrolysates thereof or mixtures of various alkali metal hydrocarbon siliconates can be employed in this invention.

If desired, the organosilicon compounds which are capable of imparting hydrophobic properties to building materials can be mixed with other materials to improve the hydrophobic properties of building materials treated therewith. Examples of such materials are organic resins, such as polymethacrylates and polyacrylates in organic solvents, vinyl chloride copolymers which are soluble in varnish solvents, epoxy resins, unsaturated polyether resins which are resistant to alkali, highly chlorinated polyolefins, chlororubber and saturated aliphatic hydrocarbons having a boiling point of at least 360° C. at 760 mm Hg (abs). When the organosilicon compounds are used in admixture with other materials capable of imparting hydrophobic properties to building materials, then the amount of organosilicon compounds employed should preferably be at least 50 percent by weight based on the total weight of the organosilicon compounds and the other materials which are employed to impart water repellency to the building materials.

Solvents which can be employed for the organosilicon compounds of this invention are the same as those which have been heretofore to impart hydrophobic properties to building materials. Depending upon the solubility of the organosilicon compounds, the solvent may consist of water or mixtures of water and an organic solvent which is miscible with water and/or organic solvents which are immiscible with water.

Examples of water miscible solvents which may be employed are alcohols such as ethanol and isopropanol; ketones such as acetone, cyclohexanone and methylethylketone; diacetone alcohol and dimethylformamide.

Examples of organic solvents which are immiscible with water are alkanes having boiling points in the range of from 120° to 180° C. at 760 mm Hg (abs), aromatic hydrocarbons such as toluene, xylene, trimethylbenzene, and tetramethylbenzene; chlorhydrocarbons such as trichloroethylene; esters such as ethyl acetate and ethers such as di-n-butylether.

Also, it is possible to use mixtures of various organic solvents. In order to achieve adequate penetration into the building materials even in the presence of high atmospheric temperature, it is preferred that the solvents have an evaporation rate which is at least 5 times slower than the evaporation rate of an identical amount of diethylether. Moreover, it is preferred that the organic solvents used be miscible with water or that at least one component of the organic solvent used be miscible with water.

It is preferred that the organosilicon compounds which are capable of imparting hydrophobic properties to building materials treated therewith, be present in the solutions of this invention in an amount of from 0.2 to 25 percent by weight based on the weight of the organosilicon compounds and the solvent.

It is essential that the amount of fillers employed in the process of this invention do not result in substantial thickening of the solution or organosilicon compound. Preferably the fillers are colorless, in order to avoid undesired coloring of the building materials.

Examples of colorless fillers having a surface area of at least 50 m$^2$/gm, are pyrogenically produced silicon dioxide (fume silica), silicon dioxide aerogels, i.e. silicic acid hydrogels which have been dehydrated while maintaining their structure; precipitated silicon dioxide having a surface area of at least 50 m$^2$/gm other than silicon dioxide aerogels and pyrogenically produced titanium dioxide. The surface area of the fillers is measured by means of nitrogen absorption as described in ASTM Special Technical Bulletin No. 51 (1941), page 95 and following. This method is generally referred to as "BET".

The fillers which have a surface area of at least 50 m$^2$/gm may also have absorbed thereon or chemically bonded thereto, organic or organosilicon compounds or groups, such as organosiloxy groups, e.g., trimethylsiloxy or dimethylsiloxy groups. Fillers modified in this way can for example be prepared by reacting pyrogenically produced silicon dioxide or precipitated silicon dioxide having a surface area of at least 50 m$^2$/gm, with organosilicon compounds which are capable of imparting hydrophobic properties thereto. Examples of suitable organosilicon compounds are trimethylethoxysilane or hexamethyldisilazane. If desired, the reaction can be carried out is a mill such as a ball mill or a roller mill.

Mixtures consisting of various fillers having a surface area of at least 50 m$^2$/gm may be employed, if desired.

It is preferred that the fillers having a surface area of at least 50 m$^2$/gm be present in the solutions of organosilicon compounds in an amount of from 0.1 to 0.5 percent by weight based on the total weight of the solution, i.e. the weight of the organosilicon compound and the solvent.

The fillers which have a surface of at least 50 m$^2$/gm can be mixed with the solvent prior to the addition of the organosilicon compounds.

In addition to fillers having a surface area of at least 50 m$^2$/gm, solvent and the organosilicon compound capable of imparting hydrophobic properties thereto, the solutions may contain additional materials, such as an agent for increasing the alkali stability or to enhance the effectivenss of the organosilicon compounds to impart hydrophobic properties to building materials. Other materials which may be employed are condensation catalysts or hydrolysis catalysts as well as fillers having a surface area of less than 50 m$^2$/gm, such as for example diatomaceous earth and pigments, such as ferrous oxide.

Examples of materials which may be used to increase the alkali stability or to enhance the effectiveness of the organosilicon compounds or which can be used as condensation catalysts or hydrolysis catalysts are aluminum stearate, aluminum alcoholates, dibutyltin dilaurate, zirconium compounds, zinc octoate and/or titanium alcoholates.

It is preferred that the solution of organosilicon compounds which contain fillers in an amount of from 0.01 to 0.99 percent by weight based on the weight of the solution and have a surface area of at least 50 m$^2$/gm, be applied to the surface of the building material at the rate of 0.1 to 2 kg/m$^2$.

Building materials which may be treated by the process of this invention are the same as those which have been treated heretofore with solutions to impart water repellency thereto. This invention is of particular significance for imparting water repellency to more or less smooth wall coatings having a sand base and inorganic materials which are hydraulically and/or non-hydraulically bonded, such as lime, cement and/or gypsum, as well as walls and objects made of concrete or asbestos cement, cinder blocks or natural stone having a low specific surface such as marble or limestone slabs.

The process of this invention is equally applicable for glazed ceramic tiles and the sand and cement mortar surfaces in brick and/or synthetic or natural stone walls which are exposed to atmospheric air.

The solutions of this invention can be applied to the surface of building materials which are to be rendered water repellent by any means known in the art for applying solutions or dispersions to normally solid surfaces, such as for example by spraying, pouring, dipping or coating with an applicator, such as a roller.

In the following examples all parts and percentages are by weight unless otherwise specified.

EXAMPLE 1

Concrete slabs measuring 20 cm $\times$ 20 cm $\times$ 4 cm are prepared with 450 parts of white cement, 450 parts of standard sand grain size I (fine), 900 parts of standard sand grain size II (coarse) and 270 parts of water pursuant to DIN 1164. The mixture is poured into wooden frames which have been placed on a smooth plastic surface. After the concrete has solidified the wood frames are removed and after 16 hours the concrete slabs are removed from the backing, placed upright on the 4 cm wide edge and allowed to stand at room temperature for 8 days.

(a) The smooth side of one of the concrete slabs is coated with approximately 340 gm/m$^2$ of a solution containing about 5 percent of an organopolysiloxane of the formula:

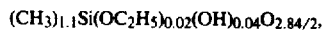

$$(CH_3)_{1.1}Si(OC_2H_5)_{0.02}(OH)_{0.04}O_{2.84/2}.$$

which consists essentially of monomethylsiloxane and a few dimethylsiloxane units, in a 50 percent toluene solution having a viscosity of from 40 to 60 cSt at 25° C., and a commercial solvent having a density of 0.873 and a boiling range of 160° to 178.5° C. whose principal ingredient consists of trimethylbenzene containing 0.2 percent of pyrogenically produced silicon dioxide having a surface area of 300 m$^2$/gm.

(v) The process described in Example 1 (a) is repeated, except that for comparison purposes the silicon dioxide is omitted.

(b) The process of Example 1 (a) is repeated except that 110 gm/m$^2$ of the mixture are applied to an asbestos cement plate.

(V1) The process described in Example 1 (b) is repeated except that for comparison purposes the silicon dioxide is omitted.

After 24 hours all the treated slabs are placed at a 30° slope under a fully opened water faucet for 1 minute. Following said treatment, the slabs which have been coated in accordance with Examples 1 (v) and (v1) are thoroughly wet and are covered with an aqueous film. In contrast to these slabs, the slabs which were coated in accordance with Examples 1 (a) and 1 (b) are still dry after the water treatment. Only a very few drops of water are visible on the surface of the slabs treated in accordance with Examples 1(a) and 1(b).

EXAMPLE 2

(a) A solution containing 4.2 parts of n-butyltrimethoxysilane, 5.8 parts of methyltrimethoxysilane, 1 part of di-n-butyltin dilaurate and 88 parts of ethanol which was first mixed with 1 part of a mixture consisting of 0.8 part of diacetone alcohol and 0.2 part of pyrogenically produced silicon dioxide having a surface area of 120 m$^2$/gm which had previously been treated with hexamethyldisilazane is brushed on a concrete wall at the rate of 420 gm/m$^2$.

(v) The process described in Example 2 (a) is repeated, except that for comparison purposes the mixture of diacetone alcohol and silicon dioxide is omitted.

After 40 minutes a jet of water is sprayed on the untreated section of the concrete wall as well as on the surfaces treated in accordance with Examples 2 (a) and 2 (v). Due to its absorption of water, the surface treated in accordance with Example 2 (v) becomes just as dark as the untreated surface, while the surface treated in accordance with Example 2 (a) remains as light in color as it was prior to the water treatment. Furthermore, no drops of water are observed on the surface treated in accordance with Example 2 (a).

While specific embodiments of this invention have been described, it is not intended to limit the invention solely thereto, but to include all the modifications falling within the spirit and scope of the appended claims.

What is claimed is:

1. An improved process for imparting hydrophobic properties to building materials by applying a solution containing a solvent and an organosilicon compound dissolved therein to the surface of said material, in which the organosilicon compound is present in an amount of from 0.2 to 25 percent by weight based on the weight of the organosilicon compound and solvent, the improvement which comprises adding to the solution from 0.01 to 0.5 percent by weight based on the total weight of the solution, of a filler having a surface area of at least 50/m$^2$/gm.

2. The improved process of claim 1, wherein the filler is silicon dioxide.

3. The improved process of claim 1 wherein the filler has organosiloxy groups on its surface.

* * * * *